United States Patent Office 3,314,767
Patented Apr. 18, 1967

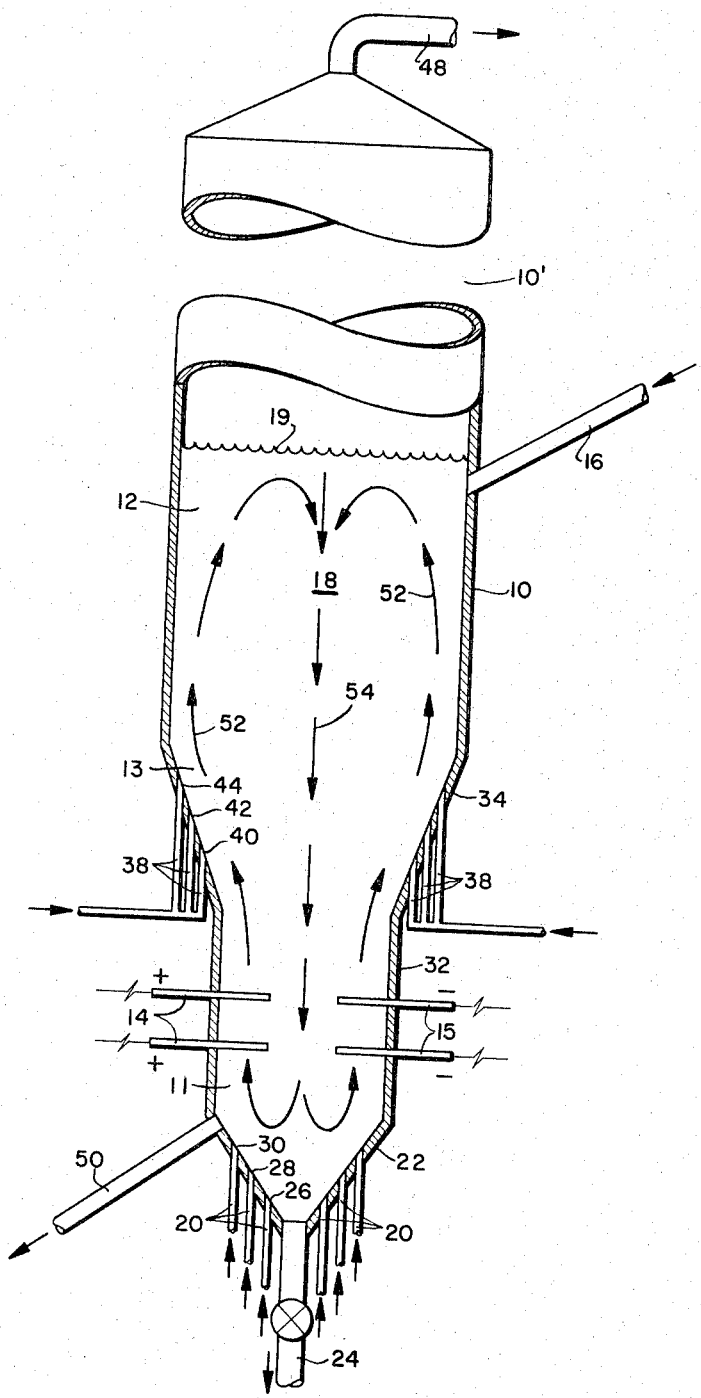

3,314,767
ELECTRO-FLUID REACTOR FOR HIGH TEMPERATURE GASIFICATION PROCESS
Jerome Bernstein, Berkeley Heights, N.J., assignor to Esso Research and Engineering Company, a corporation of Delaware
Filed June 3, 1963, Ser. No. 285,057
2 Claims. (Cl. 23—284)

The present invention is concerned with an improved method and apparatus for thermally converting hydrocarbons to coke and hydrogen. In particular, it deals with minimizing hydrogen recycle while maintaining good internal coke circulation in an electro-fluid reactor used in a coke-hydrogen high temperature gasification process.

Numerous methods for converting petroleum fractions into light gasiform products, e.g. hydrogen, have been advanced in the art. While, for example, the breakdown of methane or refinery tail gas to hydrogen and coke is a well-known chemical reaction, the elevated temperatures required for desirable yields result in relatively high costs for supplying requisite thermal energy. Thus, numerous processes which might have been theoretically sound are impractical when analyzed from a commercial viewpoint.

Recent advances in this art have shown that in areas where the cost of electricity is relatively cheap, e.g. 6–8 mills/k.w.h., this reaction can be run economically by employing electrically heated, dense fluidized beds of solids, such as coke, maintained at the reaction temperature. The solids are heated by a controlled electrical potential or voltage applied across one or more portions of the solids bed, the resistance of the solids to electrical flow resulting in their being heated to the desired temperatures. The magnitude of the electrical potential or voltage is normally within the range of 0.1 to 1000 volts/inch, preferably 3–80 volts/inch, and is controlled to cause resistance heating of the solids without resulting in electrical spark discharges within the solids mass.

The electrical power is supplied through one (or more) pair of electrodes emersed into the side of a dense phase of the fluidized coke. The electro-fluid reactor operates at 1900–2800° F., e.g., 2200–2400° F., and at 35 to 350 p.s.i.g., e.g., 250 p.s.i.g. Hydrocarbon feed is injected into the dense bed and is converted quantitatively to coke and hydrogen gas after a residence time of from about 0.2 to about 5.0 seconds.

However, these electrically heated, dense fluidized beds, while representing a great improvement over the previous methods used in the art, still produce serious operating problems. The principal difficulty which has beset operation of electrically heated fluidized beds at elevated temperatures has ben electrical failure. This failure has ensued as the result of apparent breakdown, within or in the vicinity of the fluidized bed, of the electrical insulating properties of structural elements separating electrodes operating at different potentials. Such breakdowns have caused short circuits which have been known to melt ceramic structural elements retaining the electrodes and fluidized bed.

One of the major reasons for this short-circuiting of the electrodes and the surrounding structural elements resides in the fact that the hydrocarbon feed point is located below the electrodes. It is believed that this causes coke deposition on the walls of the refractory in the electrode zone. The coke deposits form a low resistance path for the current thereby causing the short circuit which in turn results in the failure of the insulating lining.

A solution to this problem has been advanced in a co-assigned application filed concurrently with the present case by William E. Meiers and Wayne T. Andreas, identified by the inventors' docket number as CT–315 and filed as S.N. 285,058, now issued as Patent No. 3,254,957 on June 7, 1966. It has been found that by injecting the feed above the electrodes, carbon no longer deposits on the refractory thereby insuring long refractory life.

The above solution, however, is not without shortcomings of its own. When the hydrocarbon feed zone is relocated above the electrodes, a significant loss of fluidity in the electrode zone is obtained. This is due to the fact that the hydrocarbon injection contributes significantly to the fluidization of the dense coke bed and, therefore, when the feed zone is moved well above the electrode zone, it no longer is able to perform this function. Thus, in order to successfully operate an electro-fluid reactor having an electrode zone below the feed zone, it has been found necessary to recycle product hydrogen to the electrode zone thereby keeping the solids in this important zone well fluidized. Such a recycle step represents a severe economic burden on the over-all process since it adds an expensive gas compression cost and also introduces substantial heat loss to the system.

It has now been found that this hydrogen recycle can be minimized, thereby once again making the electro-fluid process commercially feasible. This is accomplished by tapering or swaging down the sides of the reactor lying between the electrode zone and the superior or superimposed reaction zone. The hydrocarbon feed is injected evenly along the angular face of the swage. This results in a gradual velocity (or density) transition between the reaction (upper) zone and the electrode (lower) zone. By introducing the feed in this manner, the reaction zone can be operated at a slightly lower velocity than the electrode zone. This will provide a slightly higher bed density in the upper zone thereby insuring that good solids circulation will be obtained. It is important that there be this good solids circulation in order that a uniform temperature be maintained throughout the reactor. As a result, a solids flow pattern will be induced in which the solids flow will require a sharply reduced amount of hydrogen recycle to maintain fluidization in the bed. The amount of this reduction is in the range of 50–80% or more of the original hydrogen recycle required. It clearly represents a great factor in the over-all economics of the system.

The various aspects of the present invention will be made more clearly apparent by reference to the accompanying drawing which shows one form of apparatus adapted to practice the present invention.

The drawing represents a swaged side electro-fluid reactor in front elevation view with a portion cut away. In the drawing there is shown an electro-fluid reactor 10 for converting a hydrocarbon feed such as methane or other normally gaseous hydrocarbons and vaporizable hydrocarbons such as naphtha, etc., to hydrogen and coke at high temperatures. Reactor 10 has a cut-away portion 10' to reduce the length of the reactor on the drawing. Reactor 10 has three major zones: an electrode heating zone 11, a reaction zone 12 and a hydrocarbon feed injection zone 13 located above the electrode zone but below the reactor zone. Reactor 10 is an elongated cylindrical vessel and in one specific design has a maximum diameter of 9 feet and an over-all length of about 65 feet. Zones 11, 12 and 13 are about 33, 24 and 8 feet long, respectively. The diameter may vary between about 1 and 50 feet and the length between about 6 and 150 feet. The zones 11, 12 and 13 are varied in length proportionately to the length of vessel 10. In the specific example described, electrode pairs are spaced every 4 to 8 feet along the electrode zone. While two electrode pairs are shown in horizontally spaced relationship, the electrodes may be longitudinally positioned with respect to reactor 10. More or less than 2 pairs of electrodes may be used. An electric potential is impressed across the electrode pairs. For convenience the positive and negative electrodes are designated 14 and 15, respectively. The potential or impressed voltage may arise from an A.C. or D.C. source, a transformer or the like being used to step up or step down the source voltage, if necessary.

Solids, generally in the form of inert petroleum coke, such as fluid coke, or coal particles, are introduced into the upper portion of reactor 10 through line 16 and are passed into the dense fluidized bed 18 therein. The coke or other solids are maintained in the form of a dense, turbulent, fluidized bed 18 having a level indicated at 19. The solid particles in the bed 18 generally range from about 10 to 1,000 microns in size, with the bulk of the solids being approximately 40 to 500 microns in diameter. The density of the fluidized bed 18 is between about 25 and 60 lbs./ft.$^3$.

Fluidizing gas, in the form of recycle product hydrogen, is introduced through a plurality of lines 20 into the lower portion of electrode zone 11 to maintain the solid particles in a dense fluidized condition. The superficial velocity of the fluidizing gas in zone 11 is between about 0.8 and 1.5 ft./sec. The bottom portion of vessel 10 is swaged down to a point and forms an inverted conical bottom wall 22 having a valved bottom outlet 24 for large coke pieces or chunks not fluidizable. The wall 32 of reactor 10 above conical bottom 22 is cylindrical and of the same diameter as the top of conical bottom 22. It is preferable that the fluidizing gas is introduced through the swaged wall 22 of vessel 10 so as to allow a more uniform gas velocity transition throughout electrode heating zone 11. The lines 20 are shown as entering the bottom wall 22 at different vertical levels as at 26, 28, 30 and spaced uniformly around the circumference of conical bottom 22. A potential is applied between electrodes 14 and 15 so as to cause heating of solids passing between them. This heating is due to the resistance of coke to the flow of electricity (coke having a resistance to the flow of electricity of about 0.01 to 10.0 ohm/in.$^3$, e.g., 0.03 ohm/in.$^3$) and is accomplished without the causing of electrical spark discharges through the fluid bed in the reaction vessel. When using carbonaceous matter, such as fluid coke, as the contact solids in fluid bed 18, a voltage of about 3 to 80 volts/inch is preferably employed to raise the temperature of the solids to about 1900 to 2800° F., e.g. 2200–2400° F. The electrical potential utilized will vary with the conductivity of the solid, the cracking desired per unit volume, the reaction temperature, etc. Broadly, it will range from about 0.1 to no more than 1,000 volts/inch.

Feed zone 13 for hydrocarbons is formed by a swaged out portion or upwardly flared portion 34 connecting the cylindrical wall 32 of zone 11 with the larger upper cylindrical wall of reactor 10 forming reaction zone 12. A hydrocarbon feed stream, preferably gasiform in nature, e.g. methane or refinery tail gas, is injected into zone 13 through a plurality of lines 38 introduced into the swaged out portion 34 at different vertical levels 40, 42 and 44 and around the circumference of swaged out portion 34. The hydrocarbon feed is introduced substantially vertically into the fluid bed 18 in feed injection zone 13. The injection takes place uniformly along the face of swaged wall 34 of zone 13. In this manner, a gradual velocity or density transition is obtained between lower electrode zone 11 and the more elevated reactor zone 12 (which will be operating at a slightly higher bed density). The hydrocarbon feed-solids mixture in feed injection zone 13 has a temperature in the range of about 1900°–2800° F., e.g. 2200–2400° F. At these temperatures, the hydrocarbon feed is thermally converted almost quantitatively to coke and hydrogen. The gaseous converted products including hydrogen are passed overhead through line 48. The fluid coke is withdrawn from the bottom portion of vessel 10 through line 50. Residence time necessary for the completion of this reaction is in the range of 0.2 to 5.0 seconds.

As the hydrocarbon feed is cracked or converted to hydrogen by contact with the heated fluid coke bed, carbonaceous matter or coke is simultaneously being deposited on the fluid contact particles in the bed 18. There is an expansion in volume as the feed is cracked and the density of the bed in the vicinity of feed lines 34 is decreased and due to the direction by which hydrocarbon feed is introduced there is a general upward flow of gaseous material and solids adjacent the wall of vessel 10 as shown by arrows 52. The fluidized solids bed, after being admixed with the hydrocarbon feed in the reaction zone 12, passes up along the wall of reaction zone 12 generally as shown by arrows 52 in dense fluidized bed 18 and then down generally as shown by arrows 54 in fluidized bed 18 down the center of the reactor vessel 10 so that the added solids are commingled as they pass down again into the upper part of electrode zone 11 to become reheated and to restart the cycle.

Utilizing feed injection through the angular swaged wall located above the electrodes results in the following important advantages over the methods of the prior art:

(1) The carbonaceous material formed during the cracking of the hydrocarbon feed will not deposit in or about the electrodes since the reaction does not take place in the electrode zone.

(2) Good solids circulation is obtained with a minimum amount of fluidizing gas needed since the hydrocarbon feed is used to aid fluidization.

(3) Uniform temperature is maintained between the electrode and reaction zones thereby allowing the reactor to operate at highest efficiency even through the two zones are separated.

The method and apparatus of the present invention are used in a commercial size reactor which produces about 400–500 tons/day of coke product. In one case the reactor of 9 feet maximum diameter is swaged down to a minimum diameter of 6 feet in the hydrocarbon feed zone. After this swaging is done, the reactor operates at full efficiency while utilizing only 50% as much hydrogen recycle as would be previously required.

In a second example, the reactor is swaged down to a minimum diameter of 4 feet. The result is about an 80% reduction in the amount of hydrogen recycle necessary to run the reactor at full efficiency. The feed, gas and physical conditions in the reactor in the above examples are given below in Table I.

TABLE I

|  | Operating Conditions for Electro-Fluid Reactors | |
| --- | --- | --- |
| Hydrocarbon Feed, Gas oil | Feed Injection Pressure. | 400 p.s.i.g. |
| Fluidizing Gas, Recycle hydrogen product. Reaction Pressure, 250 Reaction Temperature, 2,400° F | Fluidizing Gas Superficial Velocity in Zone 11. | 1.2 ft./sec. |

For a unit feeding 3770 barrels/day of gas oil and operating at a reaction temperature of 2400° F., about 30×10$^6$ s.c.f./day of hydrogen and 500 tons/day of coke of a size between about 10 and 200 mesh are recovered.

Having described the invention in particularity, that which is claimed is set forth in the appended claims.

What is claimed is:

1. An improved electrofluid apparatus for the production of hydrogen and high quality coke comprising in combination:

(A) an elongated cylindrical vessel having a top, a bottom and a side enclosing wall, said vessel having an upper region of uniform cross-section, an intermediate region having a continuously diminishing cross-section and a lower regin having a uniform cross-section equivalent to the smallest section of said intermediate region and which section is substantially smaller than the cross-section of said upper region;

(B) solids inlet means located in said upper region of said vessel;

(C) fluidizing gas inlet means located in said lower region of said vessel;

(D) a plurality of electrodes entering into said reactor vessel through said side wall in said lower region of said vessel at points which lie above said gas inlet means;

(E) hydrocarbon feed inlet means located in said side wall in said intermediate region of said vessel at points substantiallly spaced above said electrodes;

(F) gas outlet means located in the upper region of said vessel; and (G) solids outlet means located in the lower region of said vessel.

2. The apparatus of claim 1 wherein at least a portion of the bottommost part of the said lower region has a continuously diminishing cross-section and said fluidizing gas inlet means are located in said side wall of said lower region at said portion of diminishing cross-section whereby a smaller volume is provided at the bottom of said vessel thereby reducing the amount of fluidizing gas that is required to be supplied by said gas inlet means to achieve satisfactory fluidization.

References Cited by the Examiner

UNITED STATES PATENTS 1,057,213  3/1913  Benjamin _____ 48—65

MORRIS O. WOLK, *Primary Examiner.*

OSCAR R. VERTIZ, JAMES H. TAYMAN, Jr., B. LEVENSON, *Assistant Examiners.*